US011218243B2

(12) United States Patent
Chen et al.

(10) Patent No.: US 11,218,243 B2
(45) Date of Patent: Jan. 4, 2022

(54) TRANSPORT BLOCK SIZE DETERMINATION FOR NEW RADIO

(71) Applicants: TELEFONAKTIEBOLAGET LM ERICSSON (PUBL), Stockholm (SE); Yongquan Qiang, Ottawa (CA); Xixian Chen, Ottawa (CA); Jianguo Long, Kanata (CA); Hong Ren, Kanata (CA)

(72) Inventors: Xixian Chen, Ottawa (CA); Jianguo Long, Kanata (CA); Yongquan Qiang, Ottawa (CA); Hong Ren, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 8 days.

(21) Appl. No.: 16/755,773

(22) PCT Filed: Oct. 15, 2018

(86) PCT No.: PCT/IB2018/057987
§ 371 (c)(1),
(2) Date: Apr. 13, 2020

(87) PCT Pub. No.: WO2019/073464
PCT Pub. Date: Apr. 18, 2019

(65) Prior Publication Data
US 2020/0274635 A1    Aug. 27, 2020

Related U.S. Application Data

(60) Provisional application No. 62/572,048, filed on Oct. 13, 2017.

(51) Int. Cl.
*H04W 4/00*    (2018.01)
*H04L 1/00*    (2006.01)

(52) U.S. Cl.
CPC .......... *H04L 1/0003* (2013.01); *H04L 1/0007* (2013.01); *H04L 1/0009* (2013.01); *H04L 1/0016* (2013.01)

(58) Field of Classification Search
CPC ... H04L 1/0003; H04L 1/0007; H04L 1/0009; H04L 1/0016
(Continued)

(56) References Cited

U.S. PATENT DOCUMENTS 9,451,619 B2 *  9/2016  Huang .............. H04W 72/0486
9,839,039 B2 * 12/2017  Larsson ............. H04W 72/048
(Continued)

FOREIGN PATENT DOCUMENTS

WO    WO-2019073464 A1 *  4/2019  ........... H04L 1/0003

OTHER PUBLICATIONS

Bilal Al-Doori et al., "The Impact of Efficient Transport Blocks Management on the Downlink Power in MIMO Spatial Multiplexing of LTE-A," IEEE Signal Processing Letters vol. 23, No. 12, Dec. 2016, pp. 1796-1800.*

(Continued)

*Primary Examiner* — Tesfaldet Bocure
(74) *Attorney, Agent, or Firm* — Ericsson Canada Inc.

(57) ABSTRACT

A method performed by a wireless transmitter determining a transport block size (TBS) is provided. The method includes determining a TBS using a general function of a number of physical resource blocks (PRBs) to be granted (N_PRB), a number of resource elements (REs) per PRB (N_RE^(DL,PRB)), a number of layers per transport block (v), a number of bits per modulation (Q_m), and a coding rate determined by a modulation coding scheme (MCS) (R), allocating a transport block of the determined TBS and transmitting the transport block to a wireless receiver. Apparatuses for implementing the method are also provide.

15 Claims, 7 Drawing Sheets

(58) Field of Classification Search
USPC .......................................... 370/329; 375/377
See application file for complete search history.

(56) References Cited

U.S. PATENT DOCUMENTS

| | | | | |
|---|---|---|---|---|
| 2010/0303016 | A1* | 12/2010 | Jin | H04L 27/0008 370/328 |
| 2011/0223924 | A1* | 9/2011 | Lohr | H04L 1/1607 455/450 |
| 2011/0274059 | A1* | 11/2011 | Brown | H04L 5/0092 370/329 |
| 2016/0044729 | A1* | 2/2016 | Tu | H04W 72/02 370/329 |
| 2017/0223686 | A1* | 8/2017 | You | H04L 5/0048 |
| 2018/0006791 | A1* | 1/2018 | Marinier | H04L 1/1893 |
| 2019/0075492 | A1* | 3/2019 | Suzuki | H04L 1/0003 |
| 2019/0149273 | A1* | 5/2019 | Golitschek Edler von Elbwart | H04W 52/48 714/748 |
| 2021/0084532 | A1* | 3/2021 | Chen | H04L 1/06 |

OTHER PUBLICATIONS

Techplayon, "5G NR Transport Block Size (TBS) Calculation", Techplayon, Aug. 16, 2020, retrieved Jun. 11, 2021, pp. 1-11.*
Ericsson: On MCS/transport Block Size Determination,3GPP Draft; RI-1711501 on MCS Transport Block Size Determination, 3rd Generation Partnership Project (3GPP), Mobile Competence Centre; 650, Route Des Lucioles; F-06921 Sophia-Antipolis Cedex, France; vol. RAN WGI, No. Qingdao, P.R. China; Jun. 27, 2017-Jun. 30, 2017; Jun. 17, 2017 (Jun. 17, 2017), XP051305629,Retrieved from the Internet: URL:http://www.3gpp.org/ftp/tsg ran/WGI RL 1/TSGRI AH/NR AH 1706/Docs/—[retrieved on-Jun. 17, 2017], pp. 1-10.
Intel Corporation: "Resource al location and TBS",3GPP Draft; RI-1716320 Intel TBS RA, 3rd Generation Partnership Project (3GPP), Mobil Competence Centre; 650, Route Des Lucioles; F-06921 Sophia-Antipolis Cedex; France; vol. RAN WGI, No. Nagoya, Japan; Sep. 18, 2017-Sep. 21, 2017; Sep. 17, 2017 (Sep. 17, 2017), XP051339776,Retrieved from the Internet: URL:http://www.3gpp.org/ftp/Meetings 3GPP SYNC/RANI/Docs/—[retrieved on Sep. 17, 2017], pp. 1-10.
Huawei et al: "Disscussion on TB size determination",3GPP Draft; RI-1713750, 3rd Generation Partnership Project (3GPP), Mobile Competence Centre; 650, Route Des Lucioles; F-06921 Sophia-Antipolis Cedex; France; vol. RAN WGI, No. Prague, Czech Republic; Aug. 21, 2017-Aug. 25, 2017 Aug. 20, 2017 (Aug. 20, 2017), XP051316549, Retrieved from the Internet: URL:http://www.3gpp.org/ftp/Meetings 3GPP SYNC/RANI/Docs/—[retrieved on Aug. 20, 2017], pp. 1-4.
Martinez Martinez,V., International Search Report & Written Opinion of the International Searching Authority; PCT/IB2018/057987; EPO, Rijswijk, The Netherlands, dated Jan. 18, 2019.
Moision, Bruce, Decoding Complexity and Performance of Short-Block LDPC Codes Over GF(q), IPN Progress Report 42-194 • Aug. 15, 2013, California Institute of Technology, California, USA, pp. 1-16.
LTE; Evolved Universal Terrestrial Radio Access (E-UTRA);Physical layer procedures (3GPP,TS 36.213 version 14.2.0 Release 14); ETSI, 650 Route des Lucioles, F-06921 Sophia Antipolis Cedex—France, pp. 1-455.

* cited by examiner

TRANSPORT BLOCK SIZE DETERMINATION FOR NEW RADIO

TECHNICAL FIELD

This disclosure relates to wireless communication and in particular to transport block size determination for new radio (NR).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Third Generation Partnership Project (3GPP) 5G new radio (NR) uses a low-density parity check (LDPC) code as a single channel coding scheme for physical downlink shared channel (PDSCH). LDPC performance at a given coding rate depends on the coding length. Usually, as shown in FIG. 1, at coding rate 1/2, the $E_b/N_0$ requirement decreases with an increase of information block size. Thus, a higher coding gain can be obtained with a larger coding block size.

Accordingly, the transport block size (TBS) should be well designed for a different number of physical resource blocks (PRBs) to take advantage of the coding gain from coding block length.

There currently exist certain challenge(s). For example, long term evolution (LTE) uses table-based TBS determination. Table-based TBS is defined in Table 7.1.7.2.1-1 in 3GPP TS 36.213 V14.2.0. For each PRB and modulation coding scheme (MCS), the corresponding TBS is determined with a two-dimensional (size 27*110) table. Multiple TBS tables are required for 1, 2, 4, and 8 layers, respectively. Storing the TBS tables at a base station or user equipment (UE) requires a large amount of memory. Using the same approach for NR, the TBS tables would be much larger because the number of PRBs for NR is much higher than for LTE.

One potential solution includes linear mapping with the number of PRB. For example, to reduce complexity, the 5G NR standard may not include the large TBS tables. Instead, a smaller table (see Table 1 below) is used to select MCS index first.

TABLE 1

Modulation and code rate table for PDSCH

| MCS Index $I_{MCS}$ | Modulation Order $Q_m$ | Code Rate R × 1024 |
|---|---|---|
| 0 | 2 | 120 |
| 1 | 2 | 193 |
| 2 | 2 | 308 |
| 3 | 2 | 449 |
| 4 | 2 | 602 |
| 5 | 4 | 378 |
| 6 | 4 | 434 |
| 7 | 4 | 490 |
| 8 | 4 | 553 |
| 9 | 4 | 616 |
| 10 | 4 | 658 |
| 11 | 6 | 466 |
| 12 | 6 | 517 |
| 13 | 6 | 567 |
| 14 | 6 | 616 |
| 15 | 6 | 666 |
| 16 | 6 | 719 |
| 17 | 6 | 772 |
| 18 | 6 | 822 |
| 19 | 6 | 873 |
| 20 | 8 | 682.5 |
| 21 | 8 | 711 |
| 22 | 8 | 754 |
| 23 | 8 | 797 |
| 24 | 8 | 841 |
| 25 | 8 | 885 |
| 26 | 8 | 916.5 |
| 27 | 8 | 948 |
| 28 | 2 | reserved |
| 29 | 4 | |
| 30 | 6 | |
| 31 | 8 | |

For a new transmission, the UE may use MCS indexes from 0 to 27 in Table 1 to determine the modulation order and coding rate for the physical downlink shared channel. The transport block size (TBS) in bits is then determined by:

$$TBS = 8 \times \left\lceil \frac{N_{PRB} \cdot N_{RE}^{DL,PRB} \cdot v \cdot Q_m \cdot R}{8} \right\rceil$$

where
$N_{PRB}$—the number of PRBs to be granted;
$N_{RE}^{DL,PRB}$—the number of REs per PRB;
v—the number of layers per transport block;
$Q_m$—the number of bits per modulation symbol;
R—the coding rate determined by MCS.

With this equation, the TBS is a linear mapping with $N_{PRB}$ at given $N_{RE}^{DL,PRB}$, v, $Q_m$ and R. In other words, the normalized TBS (TBS/$N_{PRB}$) would be close to a constant with given $N_{RE}^{DL,PRB}$, v, $Q_m$ and R However, according to FIG. 1, the TBS at given $N_{RE}^{DL,PRB}$, v, $Q_m$ and R should not be a linear mapping with $N_{PRB}$, at least for coding block size below a certain value. The normalized TBS should be increased with $N_{PRB}$ thanks to the coding gain from increased coding block size.

For example, in LTE, the normalized TBS at a given MCS (e.g., MCS 10) is not a constant value as shown in FIG. 2. The normalized TBS in the case $N_{PRB}<20$ is much smaller than that in the case $N_{PRB}>20$, and increases with $N_{PRB}$. It indicates that TBS cannot be simply modelled as a linear mapping with $N_{PRB}$ in all cases. At least, the linear mapping is not optimized for $N_{PRB}$ below a certain value.

SUMMARY

Certain aspects of the present disclosure and their embodiments may provide solutions to the above identified challenges or other challenges. In particular embodiments, TBS determination for NR may be expressed by $$TBS = 8 \times \left\lceil \frac{f(N_{PRB}, v, Q_m, R) \cdot N_{RE}^{DL,PRB}}{8} \right\rceil$$

where, $f( )$ is a general function of $N_{PRB}$, $v$, $Q_m$ and R. The general function can be determined according to a simulation with an approximation of a formula or mapping table. Thus, the TBS is not a linear mapping with respect to a number of PRBs, but a general function of $N_{PRB}$, $v$, $Q_m$ and R.

There are, proposed herein, various embodiments which address one or more of the issues disclosed herein. Certain embodiments may provide one or more of the following technical advantage(s). Particular embodiments define more accurate TBS for NR adaptive to $N_{PRB}$, $v$, $Q_m$ and R, and improve performance by using the coding gain from coding block size of LDPC.

According to one aspect, a method a method performed by a wireless transmitter for determining a transport block size (TBS) is provided. The method includes determining a TBS using a general function of a number of physical resource blocks (PRBs) to be granted ($N_{PRB}$), a number of resource elements (REs) per PRB ($N_{RE}^{DL,PRB}$), a number of layers per transport block ($v$), a number of bits per modulation ($Q_m$), and a coding rate determined by a modulation coding scheme (MCS) (R), allocating a transport block of the determined TB, and transmitting the transport block to a wireless receiver. In some embodiments, the general function includes a linear function of $N_{PRB}$ $v$, $Q_m$ and R when the product of $N_{PRB}$, $v$, $Q_m$ and R is larger than or equal to a threshold, the general function increases faster than a linear function of $N_{PRB}$ when the product of $N_{PRB}$, $v$, $Q_m$ and R is less than the threshold while it is still a linear function of $v$, $Q_m$ and R, and for a given set of $v$, $Q_m$ and R, the TBS is a non-decreasing function of $N_{PRB}$ over the range of $N_{PRB}$. In some embodiments, the general function includes $$f(N_{PRB}, v, Q_m, R) = \begin{cases} (A(N_{PRB})^2 + BN_{PRB} + C) * v * Q_m * R & N_{PRB} * v * Q_m * R < K \\ N_{PRB} * v * Q_m * R & N_{PRB} * v * Q_m * R \geq K \end{cases}$$

In some embodiments, the general function includes $$f(N_{PRB}, v, Q_m, R) = \begin{cases} (A \times \log(N_{PRB}) + B) * v * Q_m * R & N_{PRB} * v * Q_m * R < K \\ N_{PRB} * v * Q_m * R & N_{PRB} * v * Q_m * R \geq K \end{cases}$$

According to some aspects, a wireless device and bases station for determining a transport block size (TBS) are provided. The wireless device and base station include processing circuitry configured to perform any of the steps of any of methods according to aspects of the disclosure and, optionally, power supply circuitry configured to supply power to the wireless device and base station.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Particular embodiments include determination of $f(N_{PRB}, v, Q_m, R)$. A general criterion to design a TBS formula (or table) is to ensure all TBSs corresponding to different $N_{PRB}$ (for given $v$, $Q_m$, R) results in the same (or nearly the same) BLER for the same channel condition. A function of $f(N_{PRB}, v, Q_m, R)$ with the following properties meets the criterion:

- the function is a linear function of $N_{PRB}$ $v$, $Q_m$ and R when the product of $N_{PRB}$, $v$, $Q_m$ and R is larger than or equal to a threshold
- the function increases faster than a linear function of $N_{PRB}$ when the product of $N_{PRB}$, $v$, $Q_m$ and R is less than the threshold, while the function is still a linear function of $v$, $Q_m$ and R
- This function of $N_{PRB}$ can be different for different product of $v$, $Q_m$ and R
- For a given set of $v$, $Q_m$ and R, the TBS is a non-decreasing function of $N_{PRB}$ over the whole range of $N_{PRB}$ The function can be expressed in many different forms. Some examples are shown below.

Example 1

$$f(N_{PRB}, v, Q_m, R) = \begin{cases} (A(N_{PRB})^2 + BN_{PRB} + C) * v * Q_m * R & N_{PRB} * v * Q_m * R < K \\ N_{PRB} * v * Q_m * R & N_{PRB} * v * Q_m * R \geq K \end{cases}$$

Where, the parameter A, B, C and K can be determined by simulation.

Example 2

$$f(N_{PRB}, v, Q_m, R) = \begin{cases} (A \times \log(N_{PRB}) + B) * v * Q_m * R & N_{PRB} * v * Q_m * R < K \\ N_{PRB} * v * Q_m * R & N_{PRB} * v * Q_m * R \geq K \end{cases}$$

where the parameter A, B and K can be determined by simulation.

Figure 1:
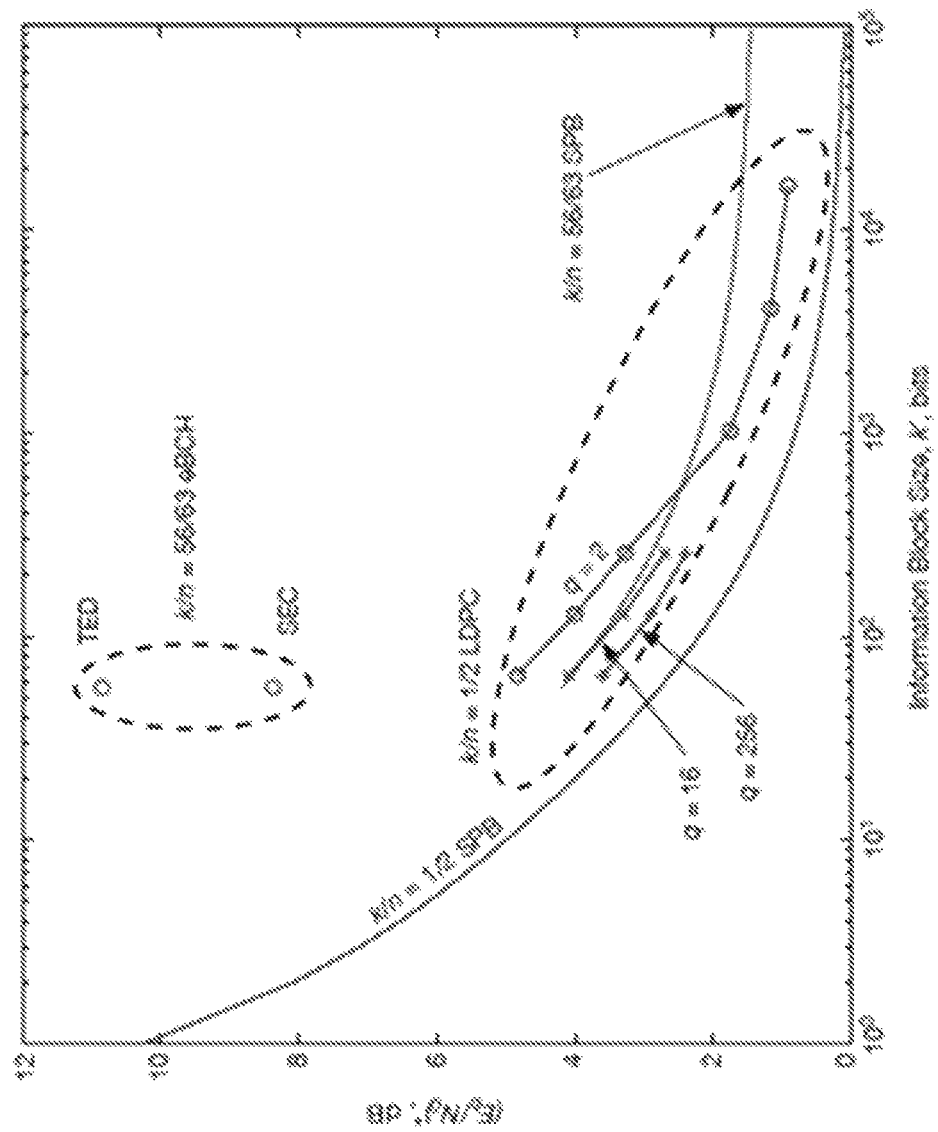
FIG. 1 is a graph illustrating $E_b/N_0$ requirement with different block size at given coding rate.
Figure 2:
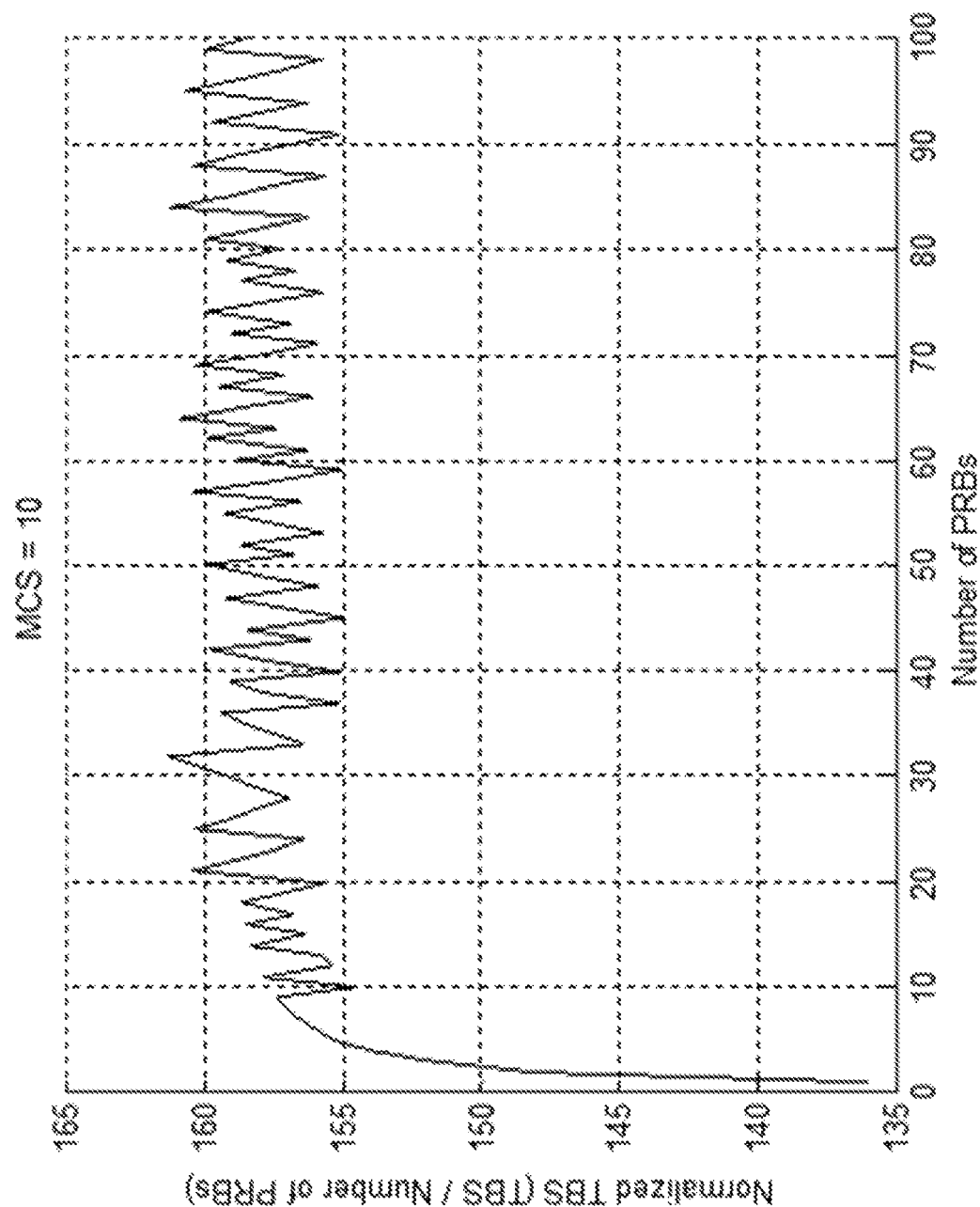
FIG. 2 is a graph of normalized TBS vs. number of PRBs in LTE.
Figure 3:
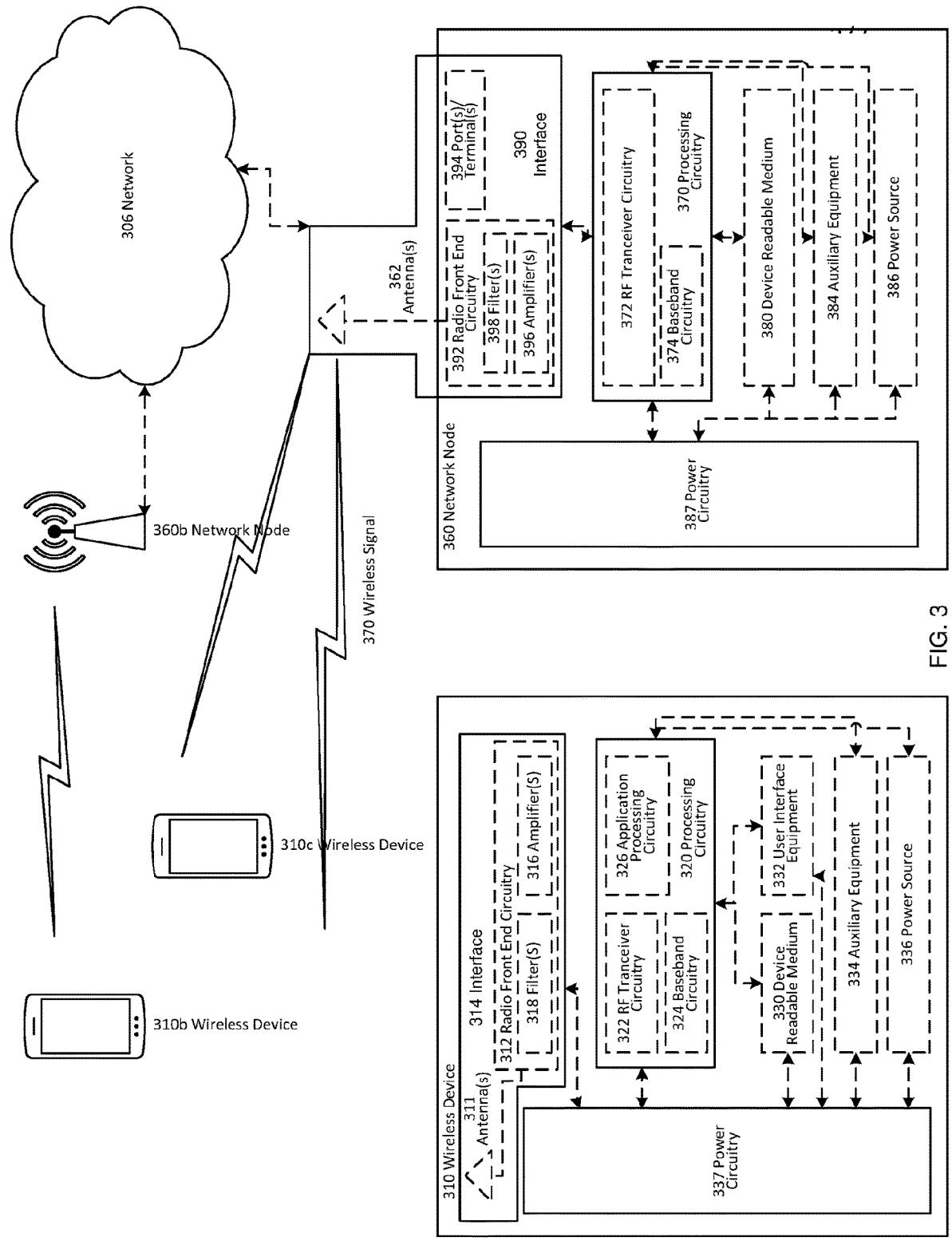
FIG. 3 illustrates a wireless network in accordance with some embodiments of the disclosure.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 306, network nodes 360 and 360b, and WDs 310, 310b, and 310c. In practice, a wireless network may further include any additional elements suitable to support communication between wireless devices or between a wireless device and another communication device, such as a landline telephone, a service provider, or any other network node or end device. Of the illustrated components, network node 360 and wireless device (WD) 310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 360 and WD 310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 360 includes processing circuitry 370, device readable medium 380, interface 390, auxiliary equipment 384, power source 386, power circuitry 387, and antenna 362. Although network node 360 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 360 are depicted as single boxes located within a larger box, or nested within multiple boxes, in practice, a network node may comprise multiple different physical components that make up a single illustrated component (e.g., device readable medium 380 may comprise multiple separate hard drives as well as multiple RAM modules).

Similarly, network node 360 may be composed of multiple physically separate components (e.g., a NodeB component and a RNC component, or a BTS component and a BSC component, etc.), which may each have their own respective components. In certain scenarios in which network node 360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 360 may be configured to support multiple radio access technologies (RATs). In such embodiments, some components may be duplicated (e.g., separate device readable medium 380 for the different RATs) and some components may be reused (e.g., the same antenna 362 may be shared by the RATs). Network node 360 may also include multiple sets of the various illustrated components for different wireless technologies integrated into network node 360, such as, for example, GSM, WCDMA, LTE, NR, WiFi, or Bluetooth wireless technologies. These wireless technologies may be integrated into the same or different chip or set of chips and other components within network node 360.

Processing circuitry 370 is configured to perform any determining, calculating, or similar operations (e.g., certain obtaining operations) described herein as being provided by a network node. These operations performed by processing circuitry 370 may include processing information obtained by processing circuitry 370 by, for example, converting the obtained information into other information, comparing the obtained information or converted information to information stored in the network node, and/or performing one or more operations based on the obtained information or converted information, and as a result of said processing making a determination.

Processing circuitry 370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 360 components, such as device readable medium 380, network node 360 functionality. For example, processing circuitry 370 may execute instructions stored in device readable medium 380 or in memory within processing circuitry 370. Such functionality may include providing any of the various wireless features, functions, or benefits discussed herein. In some embodiments, processing circuitry 370 may include a system on a chip (SOC).

In some embodiments, processing circuitry 370 may include one or more of radio frequency (RF) transceiver circuitry 372 and baseband processing circuitry 374. In some embodiments, radio frequency (RF) transceiver circuitry 372 and baseband processing circuitry 374 may be on separate chips (or sets of chips), boards, or units, such as radio units and digital units. In alternative embodiments, part or all of RF transceiver circuitry 372 and baseband processing circuitry 374 may be on the same chip or set of chips, boards, or units In certain embodiments, some or all of the functionality described herein as being provided by a network node, base station, eNB or other such network device may be performed by processing circuitry 370 executing instructions stored on device readable medium 380 or memory within processing circuitry 370. In alternative embodiments, some or all of the functionality may be provided by processing circuitry 370 without executing instructions stored on a separate or discrete device readable medium, such as in a hard-wired manner. In any of those embodiments, whether executing instructions stored on a device readable storage medium or not, processing circuitry 370 can be configured to perform the described functionality. The benefits provided by such functionality are not limited to processing circuitry 370 alone or to other components of network node 360, but are enjoyed by network node 360 as a whole, and/or by end users and the wireless network generally.

Device readable medium 380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 370. Device readable medium 380 may store any suitable instructions, data or information, including a computer program, software, an application including one or more of logic, rules, code, tables, etc. and/or other instructions capable of being executed by processing circuitry 370 and, utilized by network node 360. Device readable medium 380 may be used to store any calculations made by processing circuitry 370 and/or any data received via interface 390. In some embodiments, processing circuitry 370 and device readable medium 380 may be considered to be integrated.

Interface 390 is used in the wired or wireless communication of signalling and/or data between network node 360, network 306, and/or WDs 310. As illustrated, interface 390 comprises port(s)/terminal(s) 394 to send and receive data, for example to and from network 306 over a wired connection. Interface 390 also includes radio front end circuitry 392 that may be coupled to, or in certain embodiments a part of, antenna 362. Radio front end circuitry 392 comprises filters 398 and amplifiers 396. Radio front end circuitry 392 may be connected to antenna 362 and processing circuitry 370. Radio front end circuitry may be configured to condition signals communicated between antenna 362 and processing circuitry 370. Radio front end circuitry 392 may receive digital data that is to be sent out to other network nodes or WDs via a wireless connection. Radio front end circuitry 392 may convert the digital data into a radio signal having the appropriate channel and bandwidth parameters using a combination of filters 398 and/or amplifiers 396. The radio signal may then be transmitted via antenna 362. Similarly, when receiving data, antenna 362 may collect radio signals which are then converted into digital data by radio front end circuitry 392. The digital data may be passed to processing circuitry 370. In other embodiments, the interface may comprise different components and/or different combinations of components.

In certain alternative embodiments, network node 360 may not include separate radio front end circuitry 392, instead, processing circuitry 370 may comprise radio front end circuitry and may be connected to antenna 362 without separate radio front end circuitry 392. Similarly, in some embodiments, all or some of RF transceiver circuitry 372 may be considered a part of interface 390. In still other embodiments, interface 390 may include one or more ports or terminals 394, radio front end circuitry 392, and RF transceiver circuitry 372, as part of a radio unit (not shown), and interface 390 may communicate with baseband processing circuitry 374, which is part of a digital unit (not shown).

Antenna 362 may include one or more antennas, or antenna arrays, configured to send and/or receive wireless signals. Antenna 362 may be coupled to radio front end circuitry 390 and may be any type of antenna capable of transmitting and receiving data and/or signals wirelessly. In some embodiments, antenna 362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 362 may be separate from network node 360 and may be connectable to network node 360 through an interface or port.

Antenna 362, interface 390, and/or processing circuitry 370 may be configured to perform any receiving operations and/or certain obtaining operations described herein as being performed by a network node. Any information, data and/or signals may be received from a wireless device, another network node and/or any other network equipment. Similarly, antenna 362, interface 390, and/or processing circuitry 370 may be configured to perform any transmitting operations described herein as being performed by a network node. Any information, data and/or signals may be transmitted to a wireless device, another network node and/or any other network equipment.

Power circuitry 387 may comprise, or be coupled to, power management circuitry and is configured to supply the components of network node 360 with power for performing the functionality described herein. Power circuitry 387 may receive power from power source 386. Power source 386 and/or power circuitry 387 may be configured to provide power to the various components of network node 360 in a form suitable for the respective components (e.g., at a voltage and current level needed for each respective component). Power source 386 may either be included in, or external to, power circuitry 387 and/or network node 360. For example, network node 360 may be connectable to an external power source (e.g., an electricity outlet) via an input circuitry or interface such as an electrical cable, whereby the external power source supplies power to power circuitry 387. As a further example, power source 386 may comprise a source of power in the form of a battery or battery pack which is connected to, or integrated in, power circuitry 387. The battery may provide backup power should the external power source fail. Other types of power sources, such as photovoltaic devices, may also be used.

Alternative embodiments of network node 360 may include additional components beyond those shown in FIG. 3 that may be responsible for providing certain aspects of the network node's functionality, including any of the functionality described herein and/or any functionality necessary to support the subject matter described herein. For example, network node 360 may include user interface equipment to allow input of information into network node 360 and to allow output of information from network node 360. This may allow a user to perform diagnostic, maintenance, repair, and other administrative functions for network node 360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 310 includes antenna 311, interface 314, processing circuitry 320, device readable medium 330, user interface equipment 332, auxiliary equipment 334, power source 336 and power circuitry 337. WD 310 may include multiple sets of one or more of the illustrated components for different wireless technologies supported by WD 310, such as, for example, GSM, WCDMA, LTE, NR, WiFi, WiMAX, or Bluetooth wireless technologies, just to mention a few. These wireless technologies may be integrated into the same or different chips or set of chips as other components within WD 310.

Antenna 311 may include one or more antennas or antenna arrays, configured to send and/or receive wireless signals, and is connected to interface 314. In certain alternative embodiments, antenna 311 may be separate from WD 310 and be connectable to WD 310 through an interface or port. Antenna 311, interface 314, and/or processing circuitry 320 may be configured to perform any receiving or transmitting operations described herein as being performed by a WD. Any information, data and/or signals may be received from a network node and/or another WD. In some embodiments, radio front end circuitry and/or antenna 311 may be considered an interface.

As illustrated, interface 314 comprises radio front end circuitry 312 and antenna 311. Radio front end circuitry 312 comprises one or more filters 318 and amplifiers 316. Radio front end circuitry 314 is connected to antenna 311 and processing circuitry 320, and is configured to condition signals communicated between antenna 311 and processing circuitry 320. Radio front end circuitry 312 may be coupled to or a part of antenna 311. In some embodiments, WD 310 may not include separate radio front end circuitry 312; rather, processing circuitry 320 may comprise radio front end circuitry and may be connected to antenna 311. Similarly, in some embodiments, some or all of RF transceiver circuitry 322 may be considered a part of interface 314. Radio front end circuitry 312 may receive digital data that is to be sent out to other network nodes or WDs via a wireless connection. Radio front end circuitry 312 may convert the digital data into a radio signal having the appropriate channel and bandwidth parameters using a combination of filters 318 and/or amplifiers 316. The radio signal may then be transmitted via antenna 311. Similarly, when receiving data, antenna 311 may collect radio signals which are then converted into digital data by radio front end circuitry 312. The digital data may be passed to processing circuitry 320. In other embodiments, the interface may comprise different components and/or different combinations of components.

Processing circuitry 320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 310 components, such as device readable medium 330, WD 310 functionality. Such functionality may include providing any of the various wireless features or benefits discussed herein. For example, processing circuitry 320 may execute instructions stored in device readable medium 330 or in memory within processing circuitry 320 to provide the functionality disclosed herein.

As illustrated, processing circuitry 320 includes one or more of RF transceiver circuitry 322, baseband processing circuitry 324, and application processing circuitry 326. In other embodiments, the processing circuitry may comprise different components and/or different combinations of components. In certain embodiments processing circuitry 320 of WD 310 may comprise a SOC. In some embodiments, RF transceiver circuitry 322, baseband processing circuitry 324, and application processing circuitry 326 may be on separate chips or sets of chips. In alternative embodiments, part or all of baseband processing circuitry 324 and application processing circuitry 326 may be combined into one chip or set of chips, and RF transceiver circuitry 322 may be on a separate chip or set of chips. In still alternative embodiments, part or all of RF transceiver circuitry 322 and baseband processing circuitry 324 may be on the same chip or set of chips, and application processing circuitry 326 may be on a separate chip or set of chips. In yet other alternative embodiments, part or all of RF transceiver circuitry 322, baseband processing circuitry 324, and application processing circuitry 326 may be combined in the same chip or set of chips. In some embodiments, RF transceiver circuitry 322 may be a part of interface 314. RF transceiver circuitry 322 may condition RF signals for processing circuitry 320.

In certain embodiments, some or all of the functionality described herein as being performed by a WD may be provided by processing circuitry 320 executing instructions stored on device readable medium 330, which in certain embodiments may be a computer-readable storage medium. In alternative embodiments, some or all of the functionality may be provided by processing circuitry 320 without executing instructions stored on a separate or discrete device readable storage medium, such as in a hard-wired manner. In any of those particular embodiments, whether executing instructions stored on a device readable storage medium or not, processing circuitry 320 can be configured to perform the described functionality. The benefits provided by such functionality are not limited to processing circuitry 320 alone or to other components of WD 310, but are enjoyed by WD 310 as a whole, and/or by end users and the wireless network generally.

Processing circuitry 320 may be configured to perform any determining, calculating, or similar operations (e.g., certain obtaining operations) described herein as being performed by a WD. These operations, as performed by processing circuitry 320, may include processing information obtained by processing circuitry 320 by, for example, converting the obtained information into other information, comparing the obtained information or converted information to information stored by WD 310, and/or performing one or more operations based on the obtained information or converted information, and as a result of said processing making a determination.

Device readable medium 330 may be operable to store a computer program, software, an application including one or more of logic, rules, code, tables, etc. and/or other instructions capable of being executed by processing circuitry 320. Device readable medium 330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 320. In some embodiments, processing circuitry 320 and device readable medium 330 may be considered to be integrated.

User interface equipment 332 may provide components that allow for a human user to interact with WD 310. Such interaction may be of many forms, such as visual, audial, tactile, etc. User interface equipment 332 may be operable to produce output to the user and to allow the user to provide input to WD 310. The type of interaction may vary depending on the type of user interface equipment 332 installed in WD 310. For example, if WD 310 is a smart phone, the interaction may be via a touch screen; if WD 310 is a smart meter, the interaction may be through a screen that provides usage (e.g., the number of gallons used) or a speaker that provides an audible alert (e.g., if smoke is detected). User interface equipment 332 may include input interfaces, devices and circuits, and output interfaces, devices and circuits. User interface equipment 332 is configured to allow input of information into WD 310, and is connected to processing circuitry 320 to allow processing circuitry 320 to process the input information. User interface equipment 332 may include, for example, a microphone, a proximity or other sensor, keys/buttons, a touch display, one or more cameras, a USB port, or other input circuitry. User interface equipment 332 is also configured to allow output of information from WD 310, and to allow processing circuitry 320 to output information from WD 310. User interface equipment 332 may include, for example, a speaker, a display, vibrating circuitry, a USB port, a headphone interface, or other output circuitry. Using one or more input and output interfaces, devices, and circuits, of user interface equipment 332, WD 310 may communicate with end users and/or the wireless network, and allow them to benefit from the functionality described herein.

Auxiliary equipment 334 is operable to provide more specific functionality which may not be generally performed by WDs. This may comprise specialized sensors for doing measurements for various purposes, interfaces for additional types of communication such as wired communications etc. The inclusion and type of components of auxiliary equipment 334 may vary depending on the embodiment and/or scenario.

Power source 336 may, in some embodiments, be in the form of a battery or battery pack. Other types of power sources, such as an external power source (e.g., an electricity outlet), photovoltaic devices or power cells, may also be used. WD 310 may further comprise power circuitry 337 for delivering power from power source 336 to the various parts of WD 310 which need power from power source 336 to carry out any functionality described or indicated herein. Power circuitry 337 may in certain embodiments comprise power management circuitry. Power circuitry 337 may additionally or alternatively be operable to receive power from an external power source; in which case WD 310 may be connectable to the external power source (such as an electricity outlet) via input circuitry or an interface such as an electrical power cable. Power circuitry 337 may also in certain embodiments be operable to deliver power from an external power source to power source 336. This may be, for example, for the charging of power source 336. Power circuitry 337 may perform any formatting, converting, or other modification to the power from power source 336 to make the power suitable for the respective components of WD 310 to which power is supplied.

Figure 4:
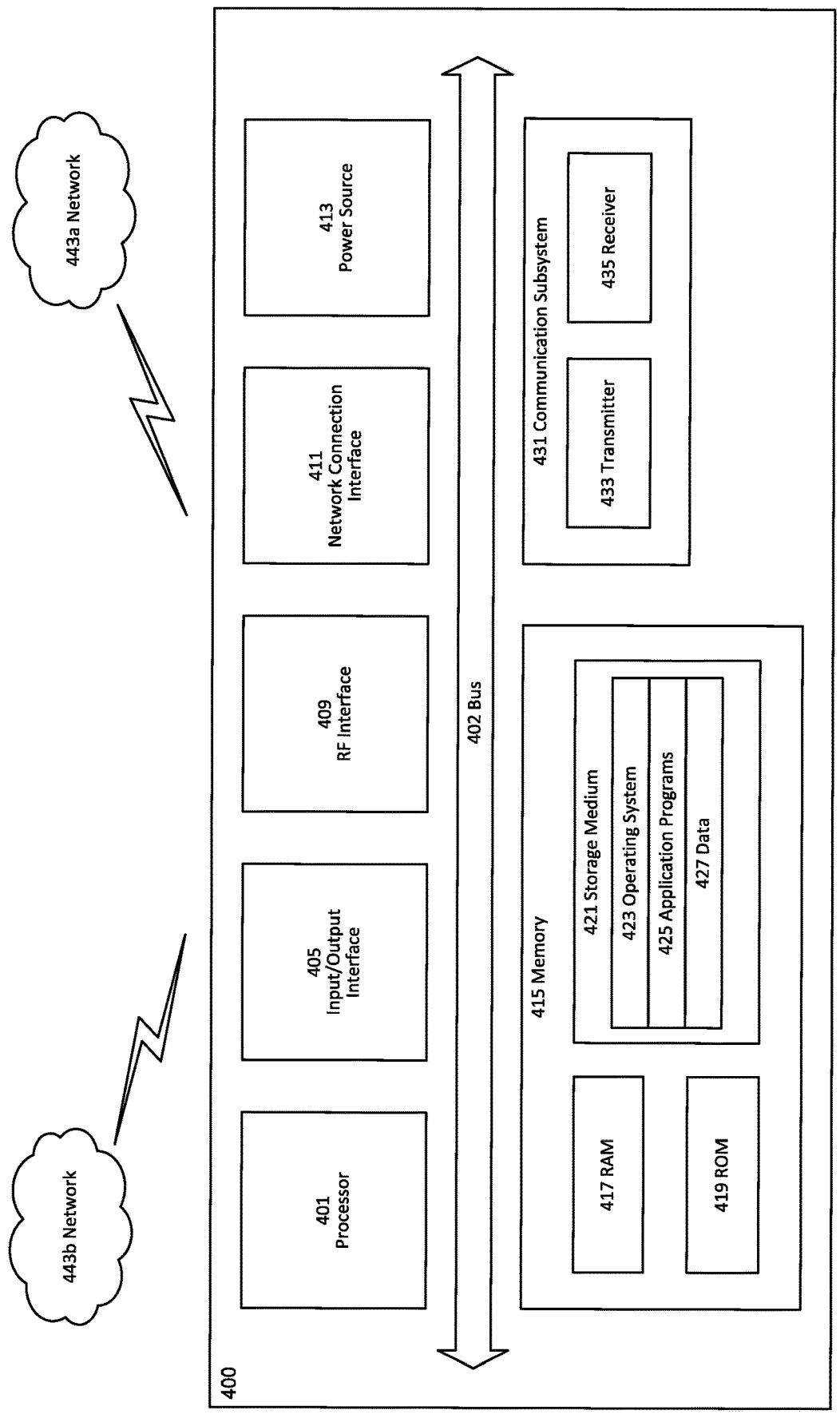
FIG. 4 illustrates a diagram of a user equipment in accordance with some embodiments of the disclosure.

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 4200 may be any UE identified by the 3rd Generation Partnership Project (3GPP), including a NB-IoT UE, a machine type communication (MTC) UE, and/or an enhanced MTC (eMTC) UE. UE 400, as illustrated in FIG. 4, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 4 is a UE, the components discussed herein are equally applicable to a WD, and vice-versa.

In FIG. 4, UE 400 includes processing circuitry 401 that is operatively coupled to input/output interface 405, radio frequency (RF) interface 409, network connection interface 411, memory 415 including random access memory (RAM) 417, read-only memory (ROM) 419, and storage medium 421 or the like, communication subsystem 431, power source 433, and/or any other component, or any combination thereof. Storage medium 421 includes operating system 423, application program 425, and data 427. In other embodiments, storage medium 421 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 401 may be configured to process computer instructions and data. Processing circuitry 401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 401 may include two central processing units (CPUs). Data may be information in a form suitable for use by a computer.

In the depicted embodiment, input/output interface 405 may be configured to provide a communication interface to an input device, output device, or input and output device. UE 400 may be configured to use an output device via input/output interface 405. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via input/output interface 405 to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 409 may be configured to provide a communication interface to RF components such as a transmitter, a receiver, and an antenna. Network connection interface 411 may be configured to provide a communication interface to network 443a. Network 443a may encompass wired and/or wireless networks such as a local-area network (LAN), a wide-area network (WAN), a computer network, a wireless network, a telecommunications network, another like network or any combination thereof. For example, network 443a may comprise a Wi-Fi network. Network connection interface 411 may be configured to include a receiver and a transmitter interface used to communicate with one or more other devices over a communication network according to one or more communication protocols, such as Ethernet, TCP/IP, SONET, ATM, or the like. Network connection interface 411 may implement receiver and transmitter functionality appropriate to the communication network links (e.g., optical, electrical, and the like). The transmitter and receiver functions may share circuit components, software or firmware, or alternatively may be implemented separately.

RAM 417 may be configured to interface via bus 402 to processing circuitry 401 to provide storage or caching of data or computer instructions during the execution of software programs such as the operating system, application programs, and device drivers. ROM 419 may be configured to provide computer instructions or data to processing circuitry 401. For example, ROM 419 may be configured to store invariant low-level system code or data for basic system functions such as basic input and output (I/O), startup, or reception of keystrokes from a keyboard that are stored in a non-volatile memory. Storage medium 421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 421 may be configured to include operating system 423, application program 425 such as a web browser application, a widget or gadget engine or another application, and data file 427. Storage medium 421 may store, for use by UE 400, any of a variety of various operating systems or combinations of operating systems.

Storage medium 421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 421 may allow UE 400 to access computer-executable instructions, application programs or the like, stored on transitory or non-transitory memory media, to off-load data, or to upload data. An article of manufacture, such as one utilizing a communication system may be tangibly embodied in storage medium 421, which may comprise a device readable medium.

In FIG. 4, processing circuitry 401 may be configured to communicate with network 443b using communication subsystem 431. Network 443a and network 443b may be the same network or networks or different network or networks. Communication subsystem 431 may be configured to include one or more transceivers used to communicate with network 443b. For example, communication subsystem 431 may be configured to include one or more transceivers used to communicate with one or more remote transceivers of another device capable of wireless communication such as another WD, UE, or base station of a radio access network (RAN) according to one or more communication protocols, such as IEEE 802.4, CDMA, WCDMA, GSM, LTE, UTRAN, WiMax, or the like. Each transceiver may include transmitter 433 and/or receiver 435 to implement transmitter or receiver functionality, respectively, appropriate to the RAN links (e.g., frequency allocations and the like). Further, transmitter 433 and receiver 435 of each transceiver may share circuit components, software or firmware, or alternatively may be implemented separately.

In the illustrated embodiment, the communication functions of communication subsystem 431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 431 may include cellular communication, Wi-Fi communication, Bluetooth communication, and GPS communication. Network 443b may encompass wired and/or wireless networks such as a local-area network (LAN), a wide-area network (WAN), a computer network, a wireless network, a telecommunications network, another like network or any combination thereof. For example, network 443b may be a cellular network, a Wi-Fi network, and/or a near-field network. Power source 413 may be configured to provide alternating current (AC) or direct current (DC) power to components of UE 400.

The features, benefits and/or functions described herein may be implemented in one of the components of UE 400 or partitioned across multiple components of UE 400. Further, the features, benefits, and/or functions described herein may be implemented in any combination of hardware, software or firmware. In one example, communication subsystem 431 may be configured to include any of the components described herein. Further, processing circuitry 401 may be configured to communicate with any of such components over bus 402. In another example, any of such components may be represented by program instructions stored in memory that when executed by processing circuitry 401 perform the corresponding functions described herein. In another example, the functionality of any of such components may be partitioned between processing circuitry 401 and communication subsystem 431. In another example, the non-computationally intensive functions of any of such components may be implemented in software or firmware and the computationally intensive functions may be implemented in hardware.

Figure 5:
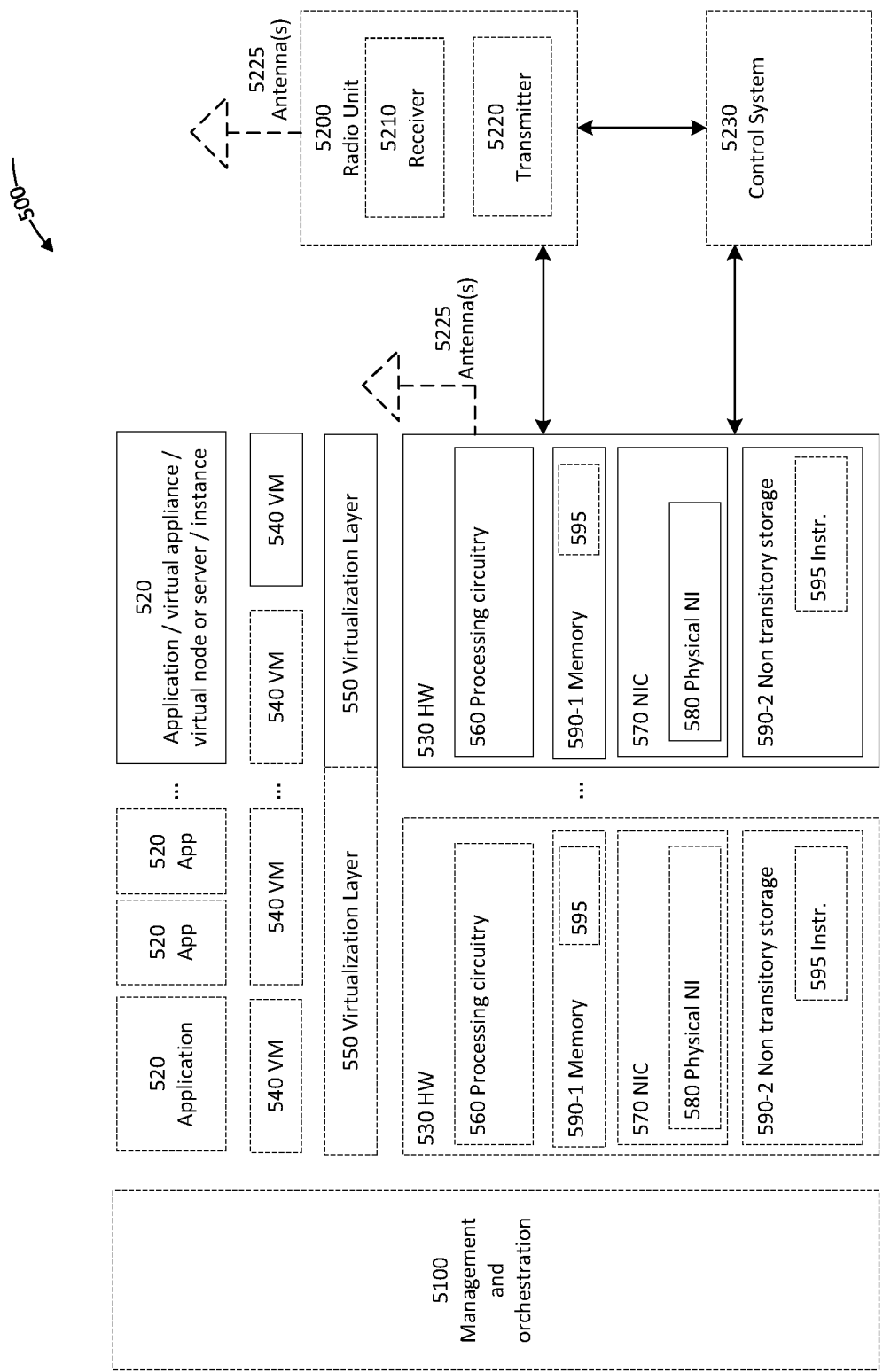
FIG. 5 illustrates a diagram of a virtualization environment in accordance with some embodiments of the disclosure.

FIG. 5 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access node or does not require radio connectivity (e.g., a core network node), then the network node may be entirely virtualized.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 are run in virtualization environment 500 which provides hardware 530 comprising processing circuitry 560 and memory 590. Memory 590 contains instructions 595 executable by processing circuitry 560 whereby application 520 is operative to provide one or more of the features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more network interface controllers (NICs) 570, also known as network interface cards, which include physical network interface 580. Each hardware device may also include non-transitory, persistent, machine-readable storage media 590-2 having stored therein software 595 and/or instructions executable by processing circuitry 560. Software 595 may include any type of software including software for instantiating one or more virtualization layers 550 (also referred to as hypervisors), software to execute virtual machines 540 as well as software allowing it to execute functions, features and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways.

During operation, processing circuitry 560 executes software 595 to instantiate the hypervisor or virtualization layer 550, which may sometimes be referred to as a virtual machine monitor (VMM). Virtualization layer 550 may present a virtual operating platform that appears like networking hardware to virtual machine 540.

As shown in FIG. 5, hardware 530 may be a standalone network node with generic or specific components. Hardware 530 may comprise antenna 5225 and may implement some functions via virtualization. Alternatively, hardware 530 may be part of a larger cluster of hardware (e.g. such as in a data center or customer premise equipment (CPE)) where many hardware nodes work together and are managed via management and orchestration (MANO) 5100, which, among others, oversees lifecycle management of applications 520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 540 may be a software implementation of a physical machine that runs programs as if they were executing on a physical, non-virtualized machine. Each of virtual machines 540, and that part of hardware 530 that executes that virtual machine, be it hardware dedicated to that virtual machine and/or hardware shared by that virtual machine with others of the virtual machines 540, forms a separate virtual network elements (VNE).

Still in the context of NFV, Virtual Network Function (VNF) is responsible for handling specific network functions that run in one or more virtual machines 540 on top of hardware networking infrastructure 530 and corresponds to application 520 in FIG. 5.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access node or a base station.

In some embodiments, some signalling can be effected with the use of control system 5230 which may alternatively be used for communication between the hardware nodes 530 and radio units 5200.

Figure 6:
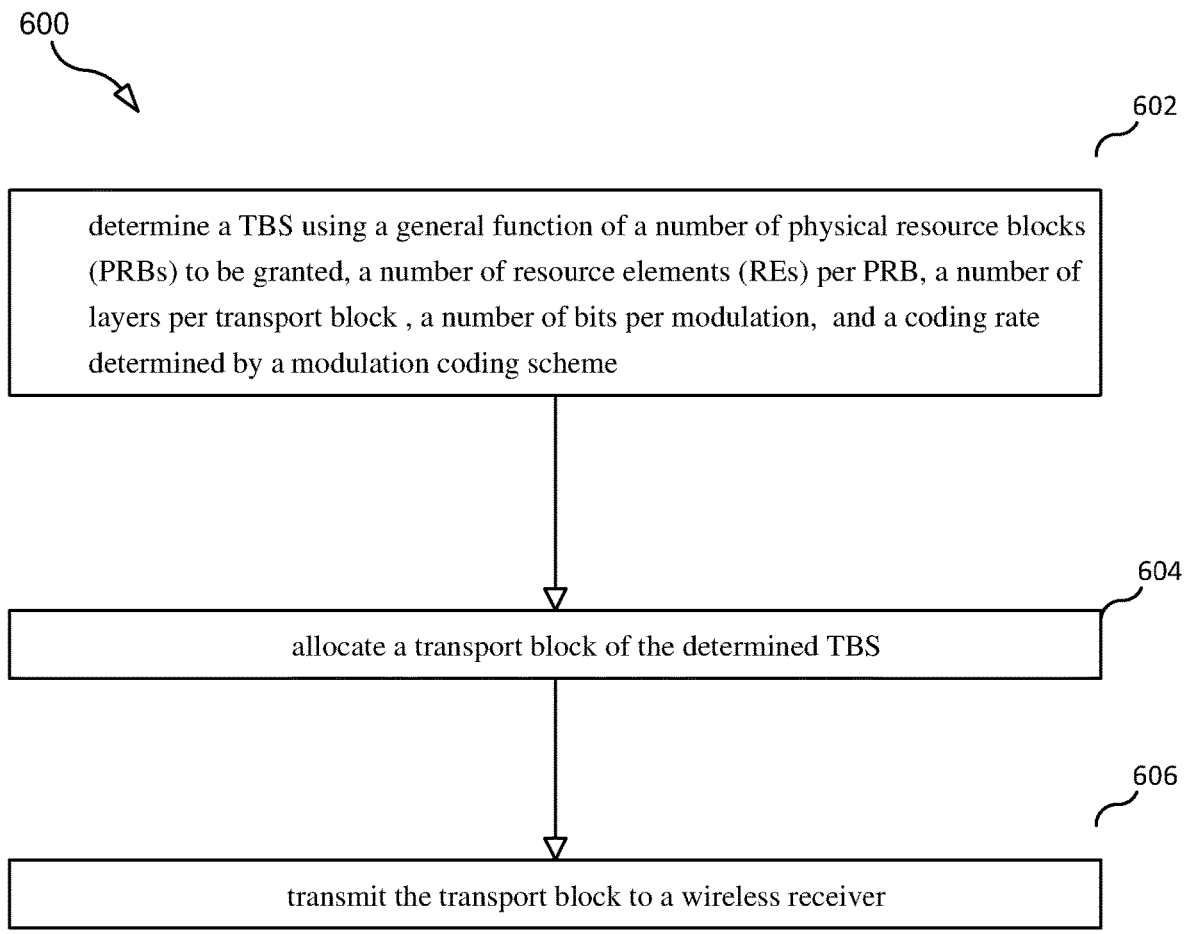
FIG. 6 illustrates a method in accordance with some embodiments of the disclosure.

FIG. 6 depicts a method in accordance with particular embodiments, the method begins at step 602 with a wireless transmitter (e.g., wireless device 310, network node 360, etc.) that determines a TBS using a general function of a number of physical resource blocks (PRBs) to be granted ($N_{PRB}$), a number of resource elements (REs) per PRB ($N_{RE}^{DL,PRB}$), a number of layers per transport block (v), a number of bits per modulation ($Q_m$), and a coding rate determined by a modulation coding scheme (MCS) (R). For example, network node 360 may determine a TBS according to any of the embodiments and examples described above.

At step 604, the wireless transmitter allocates a transport block of the determined TBS. At step 606, the wireless transmitter transmits the transport block to a wireless receiver.

Modifications, additions, or omissions may be made to the method illustrated in FIG. 6. Additionally, one or more steps in method the method of FIG. 6 may be performed in parallel or in any suitable order.

Figure 7:
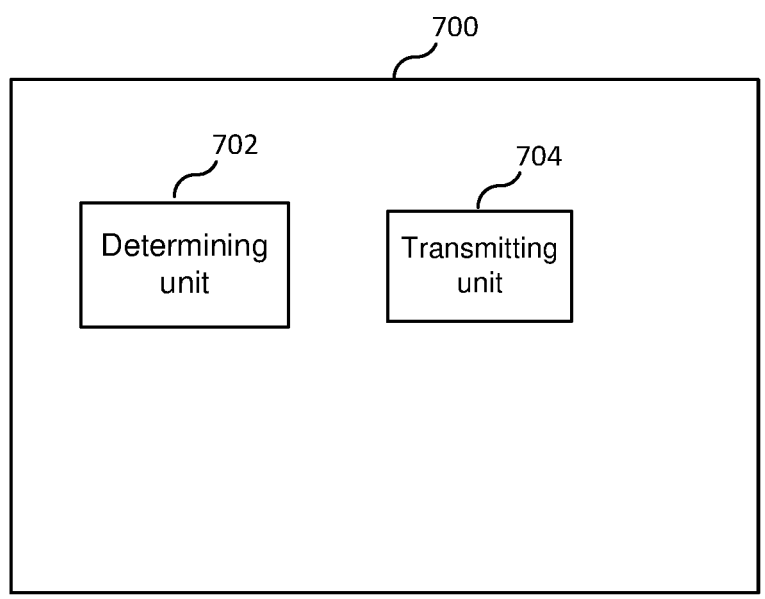
FIG. 7 illustrates a diagram of a virtualization apparatus in accordance some embodiments of the disclosure.

FIG. 7 illustrates a schematic block diagram of an apparatus 700 in a wireless network (for example, the wireless network shown in FIG. 3). The apparatus may be implemented in a wireless device or network node (e.g., wireless device 310 or network node 360 shown in FIG. 3). Apparatus 700 is operable to carry out the example method described with reference to FIG. 6 and possibly any other processes or methods disclosed herein. It is also to be understood that the method of FIG. 6 is not necessarily carried out solely by apparatus 700. At least some operations of the method can be performed by one or more other entities.

Virtual Apparatus 700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining unit 702 and transmitting unit 704, and any other suitable units of apparatus 700 to perform corresponding functions according one or more embodiments of the present disclosure.

As illustrated in FIG. 7, apparatus 700 includes determining unit 702 and transmitting unit 704. Determining unit 702 is configured to determine a TBS according to any of the embodiments and examples described above. Transmitting unit 704 is configured to transmit a TB to a wireless receiver.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DCI Downlink Control Information
DFTS OFDM Discrete Fourier Transform Spread OFDM
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
IR-HARQ Incremental Redundancy HARQ
LDPC Low-Density Parity Check
LLR Log Likelihood Ratio
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MCS Modulation Coding Scheme
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRB Physical Resource Block
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RE Resource Element
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SC Successive Cancellation
SCL Successive Cancellation List
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSB Synchronization Signal Block
SSS Secondary Synchronization Signal
TBS Transport Block Size
TDD Time Division Duplex
TDOA Time Difference of Arrival
TOA Time of Arrival TSS Tertiary Synchronization Signal
TTI Transmission Time Interval
UCI Uplink Control Information
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method performed by a wireless transmitter determining a transport block size (TBS), the method comprising:
determining a TBS using a general function of a number of physical resource blocks (PRBs) to be granted ($N_{PRB}$), a number of resource elements (REs) per PRB ($N_{RE}^{DL,PRB}$), a number of layers per transport block ($v$), a number of bits per modulation ($Q_M$), and a coding rate determined by a modulation coding scheme (MCS) (R), the general function comprises a linear function of $N_{PRB}$, $v$, $Q_m$ and R when the product of $N_{PRB}$, $v$, $Q_m$ and R is larger than or equal to a threshold, the general function increases faster than a linear function of $N_{PRB}$ when the product of $N_{PRB}$, $v$, $Q_m$ and R is less than the threshold while it is still a linear function of $v$, $Q_m$ and R, and for a given set of $v$, $Q_m$ and R, the TBS is a non-decreasing function of $N_{PRB}$ over the range of $N_{PRB}$;
allocating a transport block of the determined TBS; and
transmitting the transport block to a wireless receiver.

2. The method of claim 1, wherein the general function comprises:

$$f(N_{PRB}, v, Q_m, R) = \begin{cases} (A(N_{PRB})^2 + BN_{PRB} + C)*v*Q_m*R & N_{PRB}*v*Q_m*R < K \\ N_{PRB}*v*Q_m*R & N_{PRB}*v*Q_m*R \geq K \end{cases}.$$

3. The method of claim 1, wherein the general function comprises:

$$f(N_{PRB}, v, Q_m, R) = \begin{cases} (A \times \log(N_{PRB}) + B)*v*Q_m*R & N_{PRB}*v*Q_m*R < K \\ N_{PRB}*v*Q_m*R & N_{PRB}*v*Q_m*R \geq K \end{cases}.$$

4. A base station for determining a transport block size (TBS), the base station comprising:
power supply circuitry configured to supply power to the base station; and
processing circuitry configured to perform any of the steps of any of claims 1, 2 and 3; and
processing circuitry configured to
perform the determination of a TBS using a general function of a number of physical resource blocks (PRBs) to be granted ($N_{PRB}$), a number of resource elements (REs) per PRB ($N_{RE}^{DL,PRB}$), a number of layers per transport block ($v$), a number processing circuitry configured to perform any of the steps of any of claims 1, 2 and 3; and of bits per modulation ($Q_M$), and a coding rate determined by a modulation coding scheme (MCS) (R), wherein the general function comprises a linear function of $N_{PRB}$, $v$, $Q_m$ and R when the product of $N_{PRB}$, $v$, $Q_m$ and R is larger than or equal to a threshold, the general function increases faster than a linear function of $N_{PRB}$ when the product of $N_{PRB}$, $v$, $Q_m$ and R is less than the threshold while it is still a linear function of $v$, $Q_m$ and R, and for a given set of $v$, $Q_m$ and R, the TBS is a non-decreasing function of $N_{PRB}$ over the range of $N_{PRB}$;
allocate a transport block of the determined TBS; and
transmit the transport block to a wireless receiver.

5. The base station of claim 4, wherein the processing circuitry configured to perform the determination of a TBS using a general function, wherein the general function includes a linear function of $N_{PRB}$, $v$, $Q_m$ and R when the product of $N_{PRB}$, $v$, $Q_m$ and R is larger than or equal to a threshold, the general function increases faster than a linear function of $N_{PRB}$ when the product of $N_{PRB}$, $v$, $Q_m$ and R is less than the threshold while it is still a linear function of $v$, $Q_m$ and R, and for a given set of $v$, $Q_m$, and R, the TBS is a non-decreasing function of $N_{PRB}$ over the range of $N_{PRB}$.

6. The base station of claim 5, wherein the processing circuitry configured to perform the determination of a TBS using a general function, wherein the general function includes $$f(N_{PRB}, v, Q_m, R) = \begin{cases} (A(N_{PRB})^2 + BN_{PRB} + C)*v*Q_m*R & N_{PRB}*v*Q_m*R < K \\ N_{PRB}*v*Q_m*R & N_{PRB}*v*Q_m*R \geq K \end{cases}.$$

7. The base station of claim 5, wherein the processing circuitry configured to perform the determination of a TBS using a general function, wherein the general function includes $$f(N_{PRB}, v, Q_m, R) = \begin{cases} (A \times \log(N_{PRB}) + B)*v*Q_m*R & N_{PRB}*v*Q_m*R < K \\ N_{PRB}*v*Q_m*R & N_{PRB}*v*Q_m*R \geq K \end{cases}.$$

8. A wireless device for determining a transport block size (TBS), the wireless device comprising:
  power supply circuitry configured to supply power to the wireless device; and
  processing circuitry configured to
    perform the determination of a TBS using a general function of a number of physical resource blocks (PRBs) to be granted ($N_{PRB}$), a number of resource elements (REs) per PRB ($N_{RE}^{DL,PRB}$), a number of layers per transport block (v), a number processing circuitry configured to perform any of the steps of any of claims 1, 2 and 3; and of bits per modulation ($Q_M$), and a coding rate determined by a modulation coding scheme (MCS) (R),
    wherein the general function comprises a linear function of $N_{PRB}$, v, $Q_m$ and R when the product of $N_{PRB}$, v, $Q_m$ and R is larger than or equal to a threshold, the general function increases faster than a linear function of $N_{PRB}$ when the product of $N_{PRB}$, v, $Q_m$ and R is less than the threshold while it is still a linear function of v, $Q_m$ and R, and for a given set of v, $Q_m$ and R, the TBS is a non-decreasing function of $N_{PRB}$ over the range of $N_{PRB}$;
    allocate a transport block of the determined TBS; and
    transmit the transport block to a wireless receiver.

9. The wireless device of claim 8, wherein the processing circuitry configured to perform the determination of a TBS using a general function, wherein the general function includes a linear function of $N_{PRB}$ v, $Q_m$ and R when the product of $N_{PRB}$, v, $Q_m$ and R is larger than or equal to a threshold, the general function increases faster than a linear function of $N_{PRB}$ when the product of $N_{PRB}$, v, $Q_m$ and is less than the threshold while it is still a linear function of v, $Q_m$ and R, and for a given set of v, $Q_m$ and R, the TBS is a non-decreasing function of $N_{PRB}$ over the range of $N_{PRB}$.

10. The wireless device of claim 9, wherein the processing circuitry configured to perform the determination of a TBS using a general function, wherein the general function includes $$f(N_{PRB}, v, Q_m, R) = \begin{cases} (A(N_{PRB})^2 + BN_{PRB} + C)*v*Q_m*R & N_{PRB}*v*Q_m*R < K \\ N_{PRB}*v*Q_m*R & N_{PRB}*v*Q_m*R \geq K \end{cases}.$$

11. The wireless device of claim 9, wherein the processing circuitry configured to perform the determination of a TBS using a general function, wherein the general function includes $$f(N_{PRB}, v, Q_m, R) = \begin{cases} (A \times \log(N_{PRB}) + B)*v*Q_m*R & N_{PRB}*v*Q_m*R < K \\ N_{PRB}*v*Q_m*R & N_{PRB}*v*Q_m*R \geq K \end{cases}.$$

12. A user equipment (UE) for determining a transport block size (TBS), the UE comprising:
  an antenna configured to send and receive wireless signals;
  radio front-end circuitry connected to the antenna and to processing circuitry, and configured to condition signals communicated between the antenna and the processing circuitry;
  the processing circuitry being configured to
    perform the determination of a TBS using a general function of a number of physical resource blocks (PRBs) to be granted ($N_{PRB}$), a number of resource elements (REs) per PRB ($N_{RE}^{DL,PRB}$), a number of layers per transport block (v), a number processing circuitry configured to perform any of the steps of any of claims 1, 2 and 3; and of bits per modulation ($Q_M$), and a coding rate determined by a modulation coding scheme (MCS) (R), wherein the general function comprises a linear function of $N_{PRB}$, v, $Q_m$ and R when the product of $N_{PRB}$, v, $Q_m$ and Ris larger than or equal to a threshold, the general function increases faster than a linear function of $N_{PRB}$ when the product of $N_{PRB}$, v, $Q_m$ and R is less than the threshold while it is still a linear function of v, $Q_m$ and R, and for a given set of v, $Q_m$ and R, the TBS is a non-decreasing function of $N_{PRB}$ over the range of $N_{PRB}$;
    allocate a transport block of the determined TBS; and
    transmit the transport block to a wireless receiver;
  an input interface connected to the processing circuitry and configured to allow input of information into the UE to be processed by the processing circuitry;
  an output interface connected to the processing circuitry and configured to output information from the UE that has been processed by the processing circuitry; and
  a battery connected to the processing circuitry and configured to supply power to the UE.

13. The user equipment of claim 12, wherein the processing circuitry configured to perform the determination of a TBS using a general function, wherein the general function includes a linear function of $N_{PRB}$ v, $Q_m$ and R when the product of $N_{PRB}$, v, $Q_m$ and R is larger than or equal to a threshold, the general function increases faster than a linear function of $N_{PRB}$ when the product of $N_{PRB}$, v, $Q_m$ and R is less than the threshold while it is still a linear function of v, $Q_m$ and R, for a given set of v, $Q_m$ and R, the TBS is a non-decreasing function of $N_{PRB}$ over the range of $N_{PRB}$.

14. The user equipment of claim 13, wherein the processing circuitry configured to perform the determination of a TBS using a general function, wherein the general function includes $$f(N_{PRB}, v, Q_m, R) = \begin{cases} (A(N_{PRB})^2 + BN_{PRB} + C)*v*Q_m*R & N_{PRB}*v*Q_m*R < K \\ N_{PRB}*v*Q_m*R & N_{PRB}*v*Q_m*R \geq K \end{cases}.$$

15. The user equipment of claim 13, wherein the processing circuitry configured to perform the determination of a TBS using a general function, wherein the general function includes $$f(N_{PRB}, v, Q_m, R) = \begin{cases} (A \times \log(N_{PRB}) + B)*v*Q_m*R & N_{PRB}*v*Q_m*R < K \\ N_{PRB}*v*Q_m*R & N_{PRB}*v*Q_m*R \geq K \end{cases}.$$

* * * * *